United States Patent

Hall

[11] 4,047,458
[45] Sept. 13, 1977

[54] DISK GUIDE

[75] Inventor: Lester W. Hall, Madera, Calif.

[73] Assignee: The Raymond Lee Organization, Inc., New York, N.Y.; a part interest

[21] Appl. No.: 700,822

[22] Filed: June 29, 1976

[51] Int. Cl.² .............................................. B27B 5/02
[52] U.S. Cl. .................................... 83/439; 83/411 R
[58] Field of Search ............................. 83/439, 411 R

[56] References Cited

U.S. PATENT DOCUMENTS

| | | | |
|---|---|---|---|
| 2,157,310 | 5/1939 | Ward | 83/439 |
| 2,766,784 | 10/1956 | Antczak | 83/439 |

*Primary Examiner*—Donald R. Schran
*Attorney, Agent, or Firm*—Howard I. Podell

[57] ABSTRACT

A guide plate assembly, mountable on the table of a saw which guides a sheet rotatably fixed to the guide plate to enable the saw blade to cut the sheet into a circular disk of a desired diameter. The assembly includes a first slide bar that may be latched in position in a miter slot of the saw table, with a plate attachable to the first slide bar that is slidably latched to the first slide bar, and a second slide bar fitted with one or more cylindrical pivot holes which is also slidably latched in an open slot of the plate. A pivot screw, in the form of a wood screw fitted with a cylindrical head is fastened to the center of a sheet, to be cut, and the cylindrical head rotatably mounted in a pivot hole of the second slide bar, so that the sheet may be circularly rotated about the cutting edge of the saw blade.

2 Claims, 4 Drawing Figures

DISK GUIDE

SUMMARY OF THE INVENTION

My invention is a guide plate assembly, mountable on the table of a saw which guides a sheet rotatably fixed to the guide plate to enable the saw blade to cut the sheet into a circular disk of a desired diameter. The assembly includes a first slide bar that may be latched in position in a miter slot of the saw table, with a plate attachable to the first slide bar that is slidably latched to the first slide bar, and a second slide bar fitted with one or more cylindrical pivot holes which is also slidably latched in an open slot of the plate. A pivot screw, in the form of a wood screw fitted with a cylindrical head is fastened to the center of a sheet, to be cut, and the cylindrical head rotatably mounted in a pivot hole of the second slide bar, so that the sheet may be circularly rotated about the cutting edge of the saw blade.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
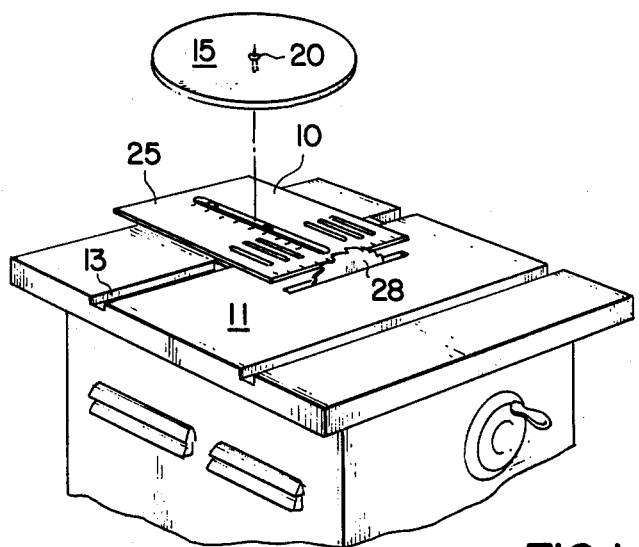
FIG. 1 is an exploded view of the invention in use.
Figure 4:
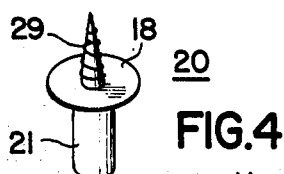
FIG. 4 is a perspective view of the pivot screw.
Figure 2:
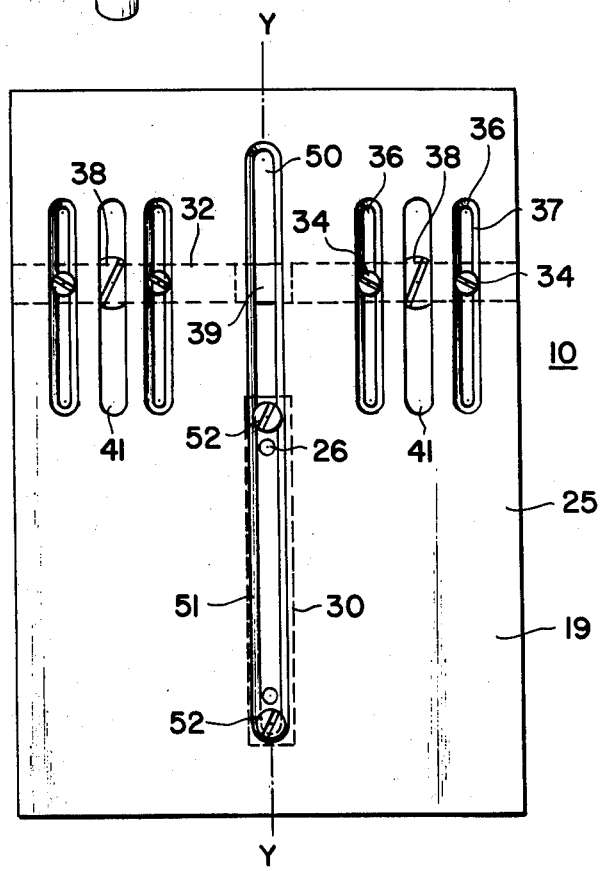
FIG. 2 is a plan view of the invention.
Figure 3:
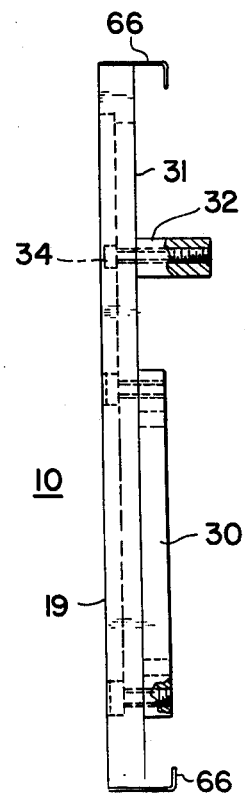
FIG. 3 is an end view of the invention.

Turning now descriptively to the drawings, in which similar reference characters denote similar elements throughout the several views, FIGS. 1-3 illustrate the guide plate assembly 10 which may be fixed to a miter slot 13 of a work table 11 for rotatably mounting a sheet 15 by means of a pivot screw 20 to the guide plate 25 of the assembly 10 so as to rotate the sheet about the pivot screw head 21 located in a circular hole 26 of a slide bar 30 to cut a circular disc 15 from the sheet by means of the saw blade 28 of the work table 11.

Plate 25 is mounted on its underside 31 to a miter bar 32 of a size to slide readily in a miter slot 13 of the work table, with miter bar 32 fitted with one or more cam head screws 38 fastened in miter bar 32 for wedging bar 32 to a fixed position in slot 13, as desired. Four screws 34 individually fasten miter bar 32 in position to individual transverse slots 36 in plate 25, with slots 36 oriented in parallel configuration along axes perpendicular to the axis of miter bar 32. Slots 36 are each formed with an oversize groove 37 extending from the face 19 of the plate 25 so that the heads of screws 34 will lie below the face 19 of plate 25.

A pair of transverse through slots 41 are located in sheet 25 each aligned with the head of a cam screw 38 to enable adjustment of the cam screws 38 for the tightening of miter bar 32 to, or loosening from, the miter slot 13.

A through lateral slot 50 extends, parallel to transverse slots 36 and 41 along a mid axis Y—Y of sheet 25 and is formed with an oversize groove 51 extending from face 19 of sheet 25 for flush mounting of a pair of screws 52 threaded to a slide bar 30 mounted to the back face 31 of sheet 25, with screws 52 serving both to orient the sliding of slide bar 30 along axis Y—Y and when tightened, fastening slide bar 30 in fixed relation to sheet 25. Slide bar 30 can be passed through a recess 39 in miter bar 32 as desired, and spacer brackets 66 mounted to the underside of plate 25 above the level of table 11 to permit slide bar 30 to move freely when screws 52 are loosened.

Pivot screw 20 is formed with a pointed tapered male screw thread 29 for fastening to a sheet 15 to be cut into a disk, with screw 20 formed with a radial flat flange 18 across the mid-section of the screw body, separating the thread 29 from a cylindrical head 21 of a size to freely rotate in any one cylindrical hole 26 of slide bar 30. Flange 18 of screw 20 is of a size to ride on upper face 19 of the plate 25 being of a greater diameter than groove 51 of slot 50.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A guide plate for mounting on the work table of a power saw, said plate fitted with means to center and rotate the work piece with regard to the cutting point of the saw, in which the guide plate is fitted with a first bar of a size to fit in the miter slot of the work table, and fitted with a slidable second bar that is formed with a cylindrical hole, said hole of a diameter to rotatably fasten the cylindrical head section of a screw which is attachable to the work piece, said screw formed with a cylindrical shaped head section joined to a tapered pointed section which pointed section is externally formed as a tapered male screw thread, with said pointed section separated from said head section by a projecting radial flange section of a size to extend beyond the circumference of the cylindrical hole of the slidable second bar, when the head section is engaged in said hole, so that the screw may freely rotate in the cylindrical hole of the slidable bar, with the flange supporting said screw in the axial direction of the screw, and so that a work piece threadably engaged in the pointed section may rest on the said radial flange section.

2. The combination as recited in claim 1 in which the slidable second bar is mounted in a groove in the guide plate extending from the face of the guide plate, and the flange section of the screw is of a size to extend beyond the width of the groove so as to freely rest on the said face of the guide plate when the head section of the screw is rotatably engaged in the cylindrical hole of the said second bar.

* * * * *